(12) United States Patent
Chang et al.

(10) Patent No.: US 7,019,868 B2
(45) Date of Patent: Mar. 28, 2006

(54) BLACK GENERATION METHOD FOR CMYK COLOR PRINTER USING MULTIPLE LOOKUP TABLES AND INTERPOLATION

(75) Inventors: James Z. Chang, Vancouver, WA (US); William C. Kress, Mission Viejo, CA (US)

(73) Assignee: Sharp Laboratories of Ameirca, Inc., Camas, WA (US)

( * ) Notice: Subject to any disclaimer, the term of this patent is extended or adjusted under 35 U.S.C. 154(b) by 801 days.

(21) Appl. No.: 09/741,458

(22) Filed: Dec. 19, 2000

(65) Prior Publication Data

US 2002/0113982 A1    Aug. 22, 2002

(51) Int. Cl.
*G06K 15/00* (2006.01)

(52) U.S. Cl. .................. 358/2.1; 358/525; 358/1.9; 358/518; 358/523; 345/604

(58) Field of Classification Search ................ 358/525, 358/529, 1.9, 522, 2.1, 518, 80, 298; 382/162
See application file for complete search history.

(56) References Cited

U.S. PATENT DOCUMENTS

| | | | |
|---|---|---|---|
| 4,275,413 A * | 6/1981 | Sakamoto et al. ........... | 358/525 |
| 4,477,833 A * | 10/1984 | Clark et al. ................ | 358/525 |
| 4,482,917 A | 11/1984 | Gaulke et al. | |
| 4,551,751 A | 11/1985 | Jung | |
| 4,590,515 A | 5/1986 | Wellendorf | |
| 5,172,223 A | 12/1992 | Suzuki et al. | |
| 5,268,754 A | 12/1993 | Van de Capelle et al. | |
| 5,305,119 A | 4/1994 | Rolleston et al. | |
| 5,402,253 A | 3/1995 | Seki | |
| 5,425,134 A | 6/1995 | Ishida | |
| 5,438,649 A * | 8/1995 | Ruetz ........................ | 358/1.9 |
| 5,502,579 A | 3/1996 | Kita et al. | |
| 5,508,827 A | 4/1996 | Po-Chieh | |
| 5,528,377 A * | 6/1996 | Hutcheson ................. | 358/1.9 |
| 5,528,386 A * | 6/1996 | Rolleston et al. ........... | 358/522 |
| 5,539,540 A * | 7/1996 | Spaulding et al. .......... | 358/518 |
| 5,553,199 A | 9/1996 | Spaulding et al. | |
| 5,581,376 A * | 12/1996 | Harrington ................. | 358/518 |

(Continued)

OTHER PUBLICATIONS

Holub et al., *The Black Printer*, Journal of Imaging Technology, vol. 15, No. 4, Aug. 1989, pp. 149-158.

*Primary Examiner*—Kimberly Williams
*Assistant Examiner*—Beniyam Menberu
(74) *Attorney, Agent, or Firm*—Robert D. Varitz, PC

(57) ABSTRACT

A method of determining colorant amounts to be laid down in a color printer includes determining an initial set of cyan, magenta and yellow (CMY) values; ordering the initial set of CMY values to determine the largest, middle and smallest values of the three values and generating an ordering vector; selecting a gamut center black generation LUT and two gamut boundary black generation LUTs from a set of black generation LUTs from a selection table; indexing the selected black generation LUTs to determine black values for each black generation LUT as a function of the minimum of the CMY values; interpolating a final output black colorant amount from the black values, and interpolating final output CMY colorant amounts from the initial set of CMY values, the maximum CMY ink limit constraint, and a set of boundary threshold values.

18 Claims, 11 Drawing Sheets

U.S. PATENT DOCUMENTS

| | | |
|---|---|---|
| 5,710,824 A | 1/1998 | Mongeon |
| 5,768,410 A * | 6/1998 | Ohta et al. ................... 382/162 |
| 5,982,990 A * | 11/1999 | Gondek ....................... 358/1.9 |
| 6,466,332 B1 * | 10/2002 | Fukasawa .................... 358/1.9 |
| 6,611,356 B1 * | 8/2003 | Shimizu et al. .............. 358/1.9 |
| 2003/0020937 A1 * | 1/2003 | Fukasawa .................... 358/1.9 |

* cited by examiner

BLACK GENERATION METHOD FOR CMYK COLOR PRINTER USING MULTIPLE LOOKUP TABLES AND INTERPOLATION

FIELD OF THE INVENTION

This invention relates to black generation techniques in CMYK color printers. Such printers lay down four kind of inks, or colorants: cyan (C), magenta (M), yellow (Y), and black (K), where black is used to enhance the shadow details of the printed images.

BACKGROUND OF THE INVENTION

In general, cyan, magenta, and yellow inks, or colorants, cannot produce a high quality black image when combined. To enhance the shadow details of printed images, and to save non-black colorants, a fourth color, black (K), also referred to herein as "key," is used. However, with the addition of black, many colors may be produced by using multiple sets of C, M, Y and K. The goal, therefore, is to find a way to optimally use C, M, Y and K.

The prior art teaches two primary approaches for achieving this goal. one approach is to use a black generation curve and three under color removal (UCR) curves. An example of such a set of curves is shown generally at 20 in FIG. 1. In the example of FIG. 1, a magenta UCR curve 22 and yellow UCR curve 24 happen to follow the same points. A cyan UCR curve is depicted at 26, while the black generation curve is depicted at 28. These curves are usually implemented as 1-D lookup tables (LUTs), where the input of the curve is used as an index to the LUTs to obtain the outputs of the curves. A desired color, in the red, green, and blue (RGB) color space, to be printed is first converted to initial C, M, and Y colorant amounts using on the following equations, which are somewhat simplified for purposes of illustration:

$$C_i=1.0-R,\ M_i=1.0-G,\ \text{and}\ Y_i=1.0-B, \quad (1)$$

where RGB and CMY values are normalized to the range between 0.0 and 1.0. The minimum of these initial CMY values, $k_1=\min(C_i, M_i, Y_i)$, is used as the index to the 1-D LUT for the black generation curve, BG(k), to obtain the output K amount, as shown in Eq. 2:

$$K=BG(k_i). \quad (2)$$

With the addition of K, the output CMY colorants should be appropriately reduced to produce the desired color. This is accomplished by using the three UCR curves for C, M, and Y, respectively, as shown in Eq. 3:

$$C=C_i-UCR_C(k_1),\ M=M_i-UCR_M(k_1),\ \text{and}\ Y=Y_i-UCR_Y(k_1). \quad (3)$$

The black generation and UCR curves are experimentally obtained for different printing processes. This basic approach, however, is not flexible enough to fully utilize the printer color gamut resulting from the addition of the K colorant.

Another approach is to use interpolation between the maximum black CMYK and the minimum black CMYK to obtain a desired CMYK. For any given color, i.e., a CIELAB value, there is a range of K values that is possible in the CMYK combination of colorants to produce that color. The lower limit is referred to as $K_{min}$, and the upper limit is referred to a $K_{max}$. A value of K is chosen between these limits, which allows black usage to change throughout the tone scale and color space. A flow chart for this approach is shown in FIG. 2, generally at 30. In this approach, the CMYK printer gamut is divided into a set of CMY gamuts indexed by the K amount. This set of CMY gamuts may be obtained by printing out an extensive set of CMYK patches and then measure them in a device independent color space, such as the CIELAB For a desired color specified in the CIELAB space, all possible CMYK combinations are obtained by 3-D interpolations using this set of CMY gamuts. The final CMYK amounts are obtained by interpolating these CMYK values using a fixed weight, α. This weighting factor controls the desired amount of black to be used. It may be changed depending on the nature of the color to be printed. For example, colors near the neutral axis will have a higher weight for black while more saturated colors will use less black because they will have a lower weight. In most implementations, only CMYK values with the maximum ($\alpha=1$) and minimum ($\alpha=0$) K amount are used.

The traditional UCR type of black generation technique is well known in the art. It is discussed in J. A. C. Yule, *Principles of Color Reproduction*, John Wiley & Sons, New York, 1967. It is also implemented in the PostScript® Language by Adobe Systems Inc., which is described in *PostScript® Language Reference Manual*, Second Edition, 1990. The newer method of interpolating between CMYK values with maximum and minimum K is discussed in M. Tsukada, et al., *New Algorithm for UCR Using Direct Color Mapping*, Proceedings of SPIE, Vol. 2413, pp. 365–374, February 1995; and R. Holub et al., *The Black Printer*, Journal of Imaging Technology, Vol. 15, No. 4, pp. 149–158, August 1989.

U.S. Pat. No. 4,482,917 to Gaulke et al., for *Method for a Reproduction of Colored Masters in Four-Color Printing Using Color Reduction*, granted Nov. 13, 1984, describes a method wherein the color gamut is divided into a gray and a chromatic region. Different UCR curves are used for the gray and chromatic regions. For colors on the boundary dividing the gray and chromatic regions, CMYK values obtained using both curves are combined to produce a single set of CMYK values for that color.

U.S. Pat. No. 4,551,751, to Jung, for *Color Reduction Dependent on Tone*, granted Nov. 5, 1985; and U.S. Pat. No. 4,590,515, to Wellendorf for *Method and Apparatus for Modifying Color Reduction Depending on Tone*, granted May 20, 1986, both describe the use of different UCR curves for image areas with different tone characteristics.

U.S. Pat. No. 5,172,223, to A. Suzuki, et al., for *Method of Processing a Color Image to Obtain Color and Black Reproduction Signals*, granted Dec. 15, 1992, describes the use of quadratic functions as the UCR curves. In addition to applying the UCR curves, a 3×3 matrix is also used to convert the input CMY values to the output CMY values.

U.S. Pat. No. 5,268,754 to Van de Capelle, et al., for *Method and a Device for Converting a Color Coordinate Set*, granted Dec. 7, 1993, describes a general strategy to convert signals in an n-dimensional color space to an m-dimensional color space. The case of m=4 is applicable to generating CMYK signals for four-color printers. Rather complex methods involving gradients are described. For methods specific to CMYK printers, only the basic UCR type of techniques is discussed.

U.S. Pat. No. 5,305,119, to R. J. Rolleston et al., for *Color Printer Calibration Architecture*, granted Apr. 19, 1994, and U.S. Pat. No. 5,528,386, granted Jun. 18, 1996, to R. J. Rolleston, et al., for *Color Printer Calibration Architecture*, describe a general CMYK printer color table generation process. Black generation using a UCR method is discussed as part of the overall printer calibration system. The traditional UCR method is used.

U.S. Pat. No. 5,402,253 to Seki, for *Color Conversion Method and Apparatus with a Variable Gray Component Replacement Ratio*, granted Mar. 28, 1995, and U.S. Pat. No. 5,502,579 to Kita, et al., for *Color Image Processing Method and Apparatus Capable of Adjusting the UCR Ratio*, granted Mar. 26, 1996, describe the use of device independent color values such as the CIELAB and LCH values to modify the black generation and UCR curves.

U.S. Pat. No. 5,425,134 to Ishida, for *Print Color Material Amount Determining Method*, granted Jun. 13, 1995, describes a method wherein a range of all the CMYK colorants that can produce a desired color is first obtained. A complex algorithm is then used to determine the common range of CMYK values which produce all of the desired colors. The final CMYK colorants for a particular color are selected from the common range.

U.S. Pat. No. 5,508,827 to Po-Chien, for *Color Separation Processing Method and Apparatus for a Four Color Printer Using Color Solid Corresponding to Tristimulus Values*, granted Apr. 16, 1996, describes the determination of CMYK values with maximum and minimum possible K. Then linear interpolation is used to obtain the final CMYK values based on the desired K amount.

U S. Pat. No. 5,553,199 to Spaulding, et al., for *Method and Apparatus for Calibrating a Four Color Printer*, granted Sep. 3, 1996, describes the development of a maximum K strategy and a minimum K strategy. The strategies are implemented by 3-D interpolations. For input CMY values, the maximum and minimum K strategies are used to generate two CMYK sets. Then a parameter indicating the desired K amount is used to interpolate these two CMYK sets to obtain the final CMYK values.

U.S. Pat. No. 5,710,824 to Mongeon, for *System to Improve Printer Gamut*, granted Jan. 20, 1998, describes the use of both the maximum and minimum input CMY values to control the K usage. A non-linear function is used to control the K addition based on the primary colorant amount.

SUMMARY OF THE INVENTION

A method of determining colorant amounts to be laid down in a color printer includes determining an initial set of cyan, magenta and yellow (CMY) values; ordering the initial set of CMY values to determine the largest, middle and smallest values of the three values and generating an ordering vector; selecting a gamut center black generation LUT and two gamut boundary black generation LUTs from a set of black generation LUTs; indexing the selected black generation LUTs to determine black values for each black generation LUT as a function of the minimum of the CMY values; interpolating the final output black colorant amount from the black values; and interpolating the final output CMY colorant amounts from the initial set of CMY values, the maximum CMY ink limit constraint, and a set of boundary threshold values.

An object of the invention is to provide a method wherein interpolation over the entire printer input color gamut is used to control the amount of C, M, Y, and K to be printed.

Another object of the invention is to provide a method wherein the final CMYK amount is obtained by interpolation based on black generation curves.

A further object of the invention is to provide procedures for optimally generating black generation curves to maximize the printing gamut.

Another object of the invention is to automatically control black usage by the black generation curves inside and on the boundary of the printer input color gamut.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENT

Figure 1:
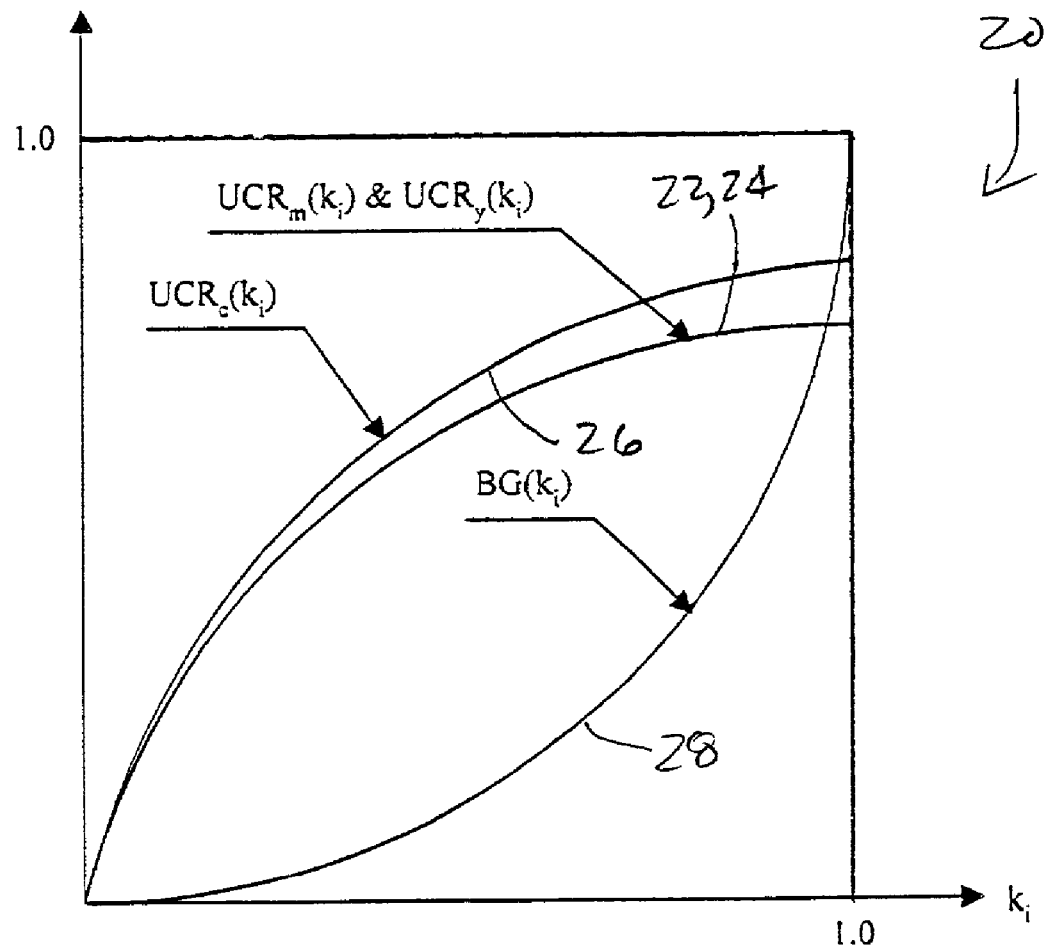
FIG. 1 depicts prior art black generation and under color removal (UCR) curves
Figure 2:
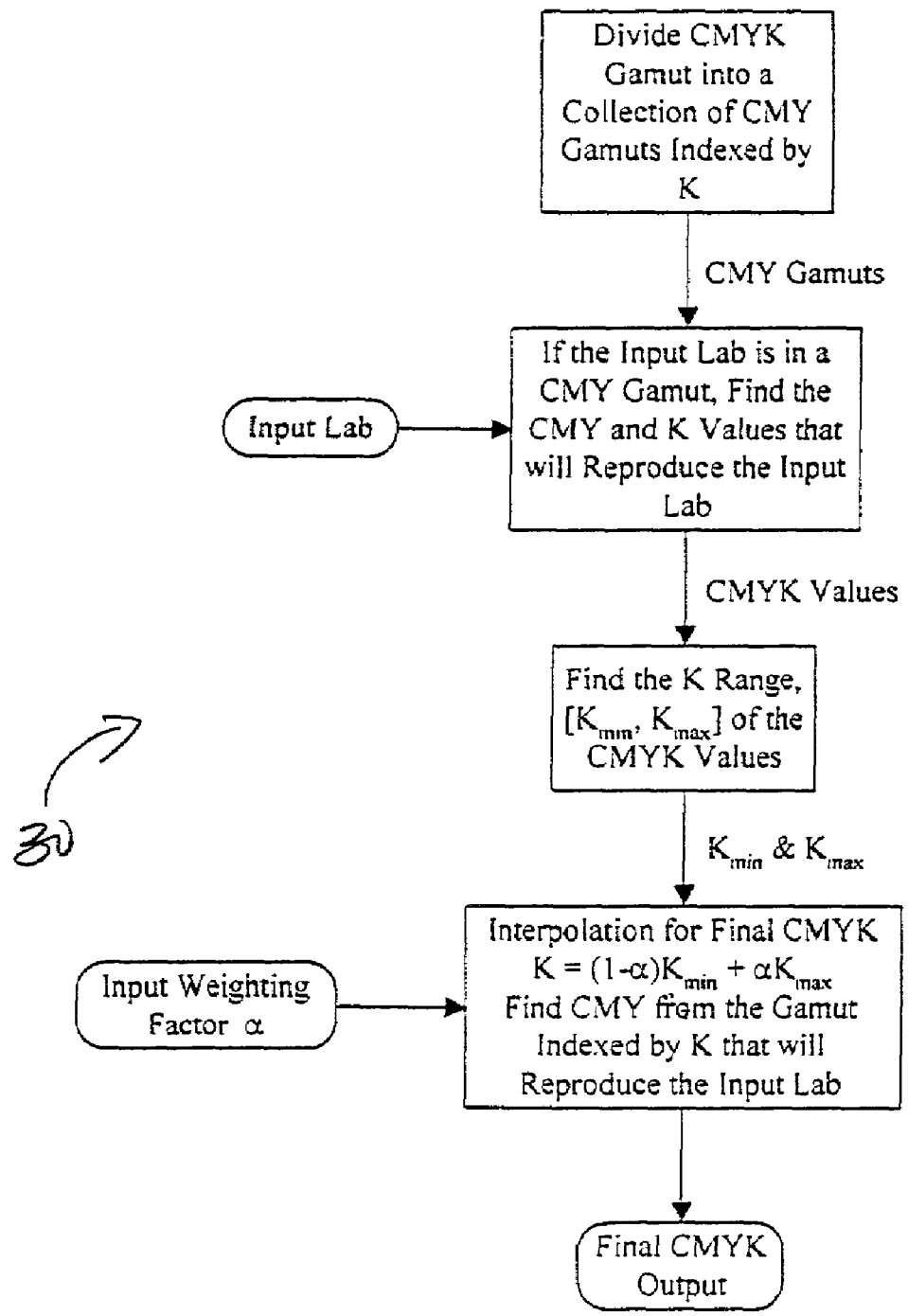
FIG. 2 is a flow chart for prior art techniques which interpolate between CMYK values with the maximum and minimum black value to obtain the final output CMYK values.

There are three subtractive primaries usually used in printing devices Cyan, Magenta and Yellow. All hues can be generated by these colorants, but additional colorants may be used to extend the color gamut beyond that of use of CMY only. The most common colorant used is black.

This disclosure considers a CMYK printer. The term "printer input color gamut" refers to the CMY primaries and the term "printer output color gamut" refers to the set of colors obtainable using black (K) colorant.

Adding K to CMY lowers the L* value of the resulting color, so some amount of CMY must be removed. The term undercolor removal (UCR) defines the reduction of CMY amounts along a neutral scale, while the term gray component replacement (GCR) defines the reduction of CMY amounts throughout the entire gamut of the printer. There are other schemes used to increase gamut in select areas, and one of these is referred to as undercolor addition (UCA).

UCA is the addition of K in the darkest areas of the images and adds detail in the shadow regions.

Put another way, the typical GCR/UCR strategy is to define X=min(C, M, Y) and have K=f(X). Then C'=C−g(X), etc., where f and g are functions that are addressed in this disclosure, and are designed for optimizing the attributes of gamut, ink usage, neutral consistency, granularity, etc. This disclosure focuses on a form of GCR.

The invention generates a black, or key, colorant for CMYK color printers to maximize the gamut of the printer. In general, cyan (C), magenta (M), and yellow (Y) colorants, or inks, when combined, cannot produce a true black, and produce only a dark brownish color. To enhance shadow details of a printed image, a fourth colorant, black (K), is used. With the addition of black, many colors may be produced by multiple sets of C, M, Y, and K This invention provides an optimal way to use CMY and K with the objective of maximizing the printer gamut, thereby using the best set of any multiple sets to produce a particular color.

This invention uses interpolation over the entire printer input color space to control the amount of C, M, Y, and K colorant applied in generating a desired color. For each color, similar to the aforementioned UCR-based methods, the invention begins with an initial set of CMY values, $C_i$, $M_i$ and $Y_i$, and then determines the final CMYK amounts. The minimum of this initial CMY amount is also used as one of the parameters to control the black generation.

An advantage of the invention is that in addition to a black generation LUT, used in the center of the printer input gamut, where $C_i=M_i=Y_i$, referred to herein as the "gamut center black generation LUT," multiple black generation LUTs are used on the boundary of the gamut, where max($C_i$, $M_i$, $Y_i$)=1.0, to control the final CMYK amount, referred to herein as the "gamut boundary black generation LUTs." Put another way, at least one, and not more than two, of the $C_i$, $M_i$, $Y_i$ values=1.0, and at least one of the $C_i$, $M_i$, $Y_i$ values=zero. The gamut center black generation LUT and the gamut boundary black generation LUTs comprise what is referred to herein as a "black generation LUT set." The final CMYK amount is obtained by interpolation based on the black generation LUT set. Specific procedures are described later herein for optimally generating the black generation LUT set to maximize the printer output gamut.

Figure 3:
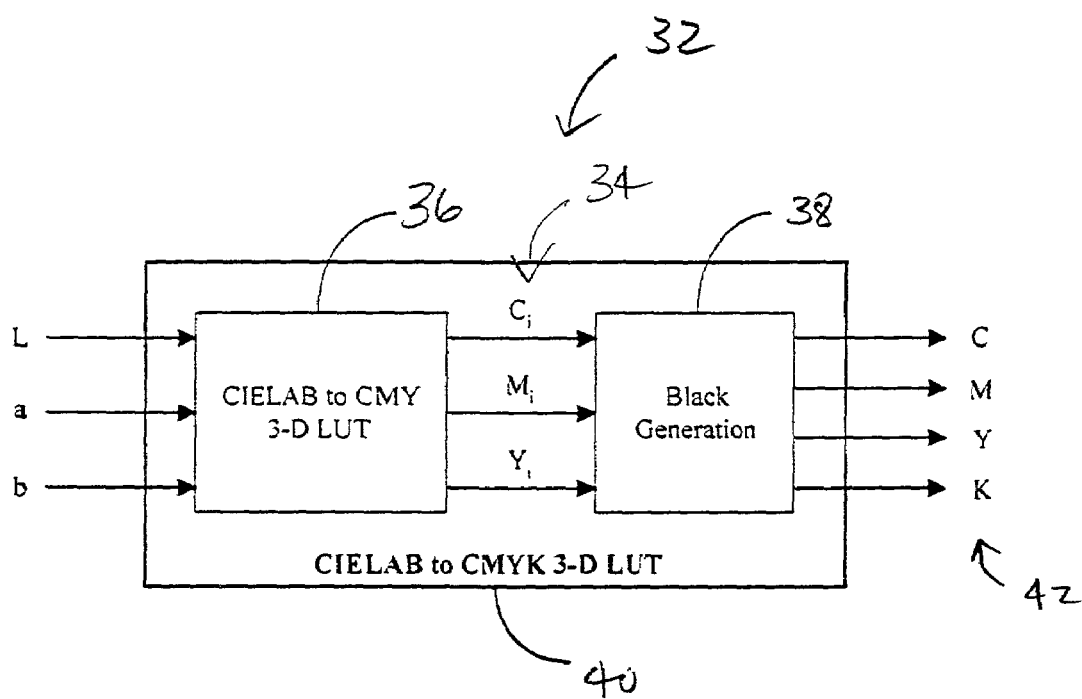
FIG. 3 is a block diagram of a system incorporating the black generation method of the invention.

A system incorporating the method of the invention is depicted in FIG. 3, generally at 32, The method of the invention is an extension of the traditional UCR method which includes the use of additional black generation curves on the boundary of the input color cube. The black generation scheme over the entire input color space is provided by interpolation using the boundary black generation curves and the black generation curve at the center of the color cube. This provides more flexible control of the black generation strategy over the entire input color space. Linear interpolations use different weighting factors based on the spatial coordinate of the input color 34, which controls the amount of black being used, and which are different from those used in the prior art techniques. The method of the invention solves the problem of converting a generic device RGB or CMY color space into a CMYK space. In order to obtain the CMYK values for input colors specified in a device-independent color space, such as the CIELAB space, a 3D-color table is generated for the input RGB, or CMY, space. Color table 36 may be combined with a black generation process 38 of the invention to generate a combined color LUT 40 in order to convert colors specified in a device-independent color space directly to CMYK device values 42.

Algorithm Description

Figure 4:
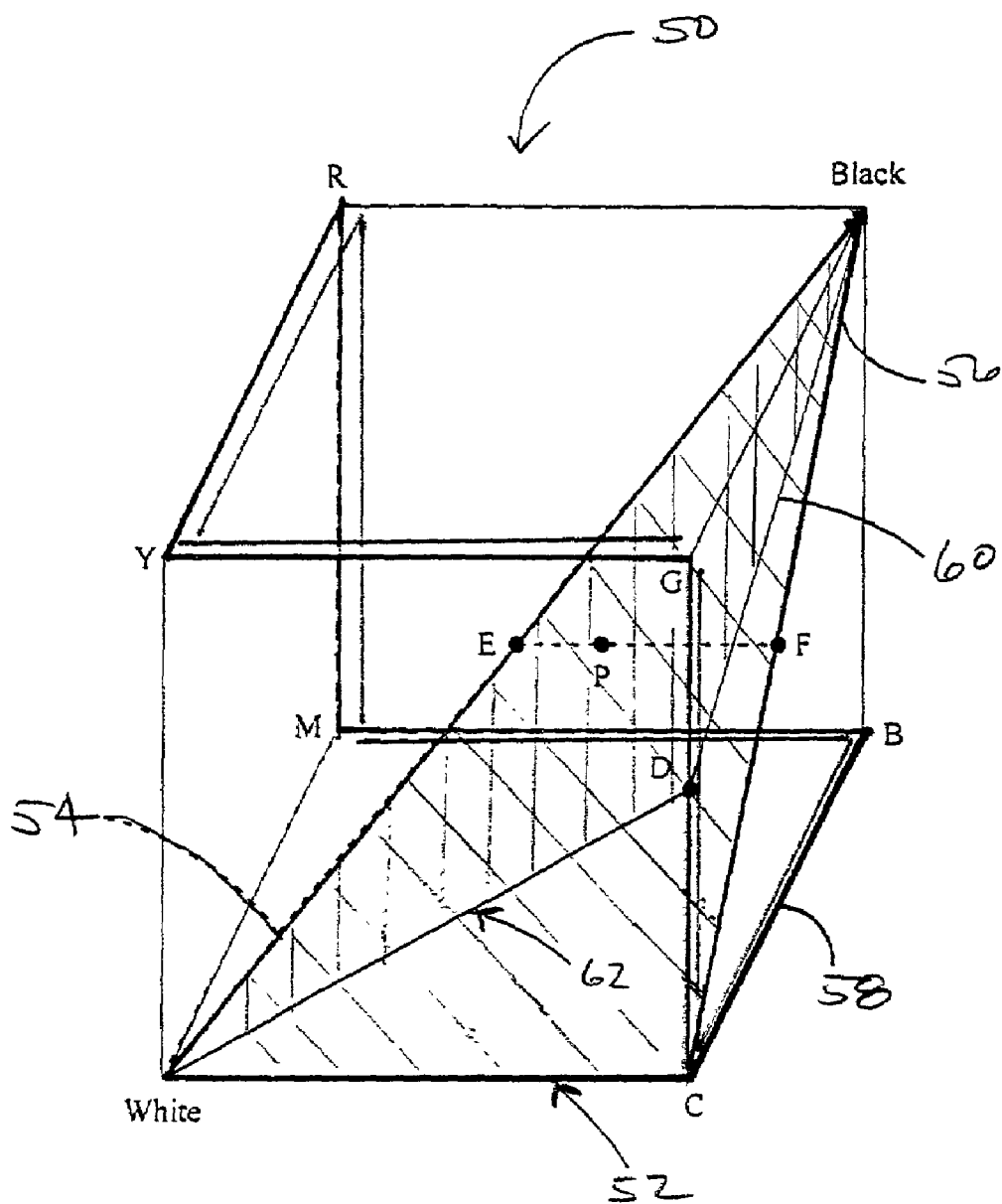
FIG. 4 depicts a printer input CMY cube.

FIG. 4 depicts the initial CMY input color space as the CMY cube, generally at 50, and illustrates the method of the invention for determining the output CMYK values using the black generation LUT at a central diagonal and the C-to-black boundary of the cube. A triangular plane, or surface, 52, connected by vertices "White", "Black", and "C," is used to illustrate the basic algorithm of the invention. It should be noted that while vector quantities are generally shown in italicized or bolded font, normal fonts have been used herein for the sake of clarity. Those of ordinary skill in the art will readily recognize that many of the quantities here are vector quantities.

First, the method for obtaining output CMYK values on a center diagonal line 54, also referred to herein as a gamut center black generation curve, connecting "White" and "Black," is described. In the initial CMY space, points on this line have equal CMY, $C_i=M_i=Y_i$, going from 0.0 ("White") to 1.0 ("Black"). These equal CMY values are denoted as $CMY_i$, and will be used as the index to the black generation LUT, $BG_0$, at center diagonal line 54, to obtain the desired K amount at the center diagonal:

$$K=BG_0(CMY_i). \quad (4)$$

The output CMY values on center diagonal 54 are equal to one another, but they are scaled by the maximum output CMY amount, $CMY_{max}$. Therefore, the output C, M, or Y values will be:

$$CMY=CMY_1*CMY_{max}. \quad (5)$$

There is also a boundary black generation LUT, $BG_C$, on a boundary line 56, also referred to herein as a gamut boundary black generation curve, connecting "C" to "Black." On line 56, $C_i$=1.0, and $M_i=Y_i$ goes from 0.0 at "C" to 1.0 at "Black." The equal MY value is denoted as $MY_1$, and is used as the index to look up the K amount from the boundary black generation LUT on the cyan-to-black boundary:

$$K=BG_c(MY_i). \quad (6)$$

Figure 5:
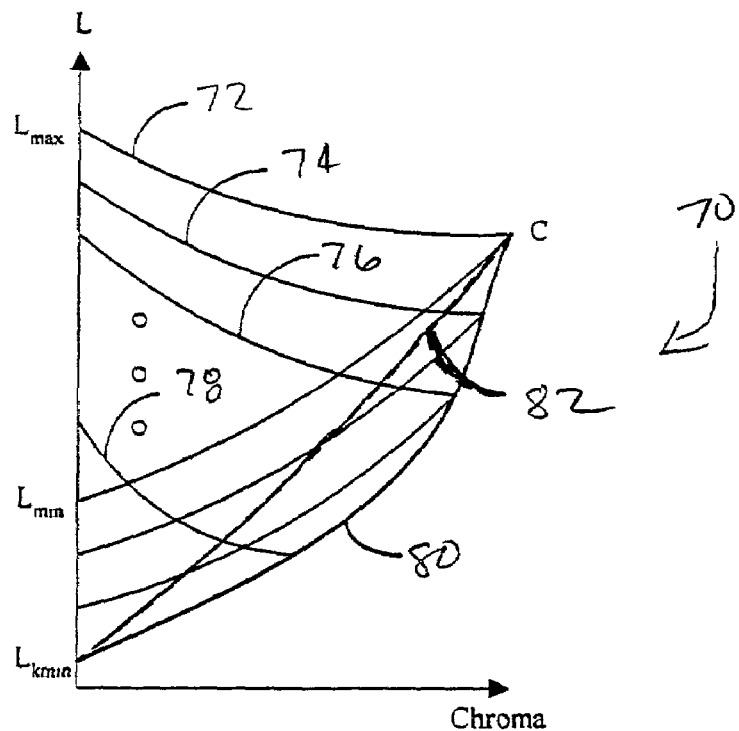
FIG. 5 depicts a collection of gamut pieces bounded by white, black, and cyan in the CIELAB space for different K amounts.

In order to maximize the output printer gamut, after the addition of K on the cyan-to-black boundary, the output M and Y amounts are set to zero, rather than being increased from 0.0 at "C" to 1.0 at "Black." The reason for this is shown in FIG. 5, generally at 70, where the (gamuts of the triangular plane 52 for different K amount are plotted on a Chroma-L plane at the hue angle of the pure cyan ink, or colorant, in the CIELAB space. If no K is used (K=0), gamut 72 is bounded by a curve from the maximum L value, $L_{max}$, to the pure cyan point "C", and then a curve from "C" to the minimum L value without K, $L_{min}$. As the amount of K increases, this gamut is compressed and shifted down along the L direction, creating gamut pieces 74, 76, and 78, where 78 is the gamut for the maximum output K amount. Generally, adding K causes L* to decrease and c* to decrease, however, the gamut is increased beyond that which would be achieved by increasing a colorant other than K. The maximum gamut boundary is obtained by connecting the outer gamut tips on the right as shown by heavy curve 80. On the tips of these gamut pieces, the C amount is 1.0 and the M and Y amount is 0.0. Therefore, in order to obtain the maximum output gamut, the output M and Y amount should be zero on the boundary from "C" to "Black" and only K should be increased to bring the gamut from pure cyan "C" to the minimum L with K, $L_{kmin}$. In the prior art techniques the gamut is usually less than the maximum allowable, as shown by heavy curve 82.

However, and now referring to FIG. 4, setting output C=1.0 and M=Y=0.0 on line 56 will create a conflict on the "Black" vertex because, on diagonal line 54, the output C, M, and Y should be equal to one another, and should range from 0.0 at "White" to $CMY_{max}$ at "Black" To ensure the smoothness of the output CMY values on line 56, a threshold $T_C$ is used to control transition from equal output CMY, $C=M=Y=CMY_{max}$, at "Black" to C=1.0 and M=Y=0.0. If the input $MY_i$ is greater than $T_C$, the output C and MY values will linearly transition from 1.0 and 0.0 to $CMY_{max}$, respectively. Otherwise, they are set to C=1.0 and M=Y=0.0. The CMY output responses on line 56 are given by Eqs. 7 and 8:

$$C = \frac{CMY_{max} - 1.0}{1.0 - T_C}(MY_i - T_C) + 1.0 \text{ if } MY_i \geq T_C, \text{ otherwise} \quad (7)$$
$$C = 1.0,$$

and $$M = Y = \frac{CMY_{max}}{1.0 - T_C}(MY_i - T_C) \text{ if } MY_i \geq T_C, \text{ otherwise} \quad (8)$$
$$M = Y = 0.0.$$

Figure 6:
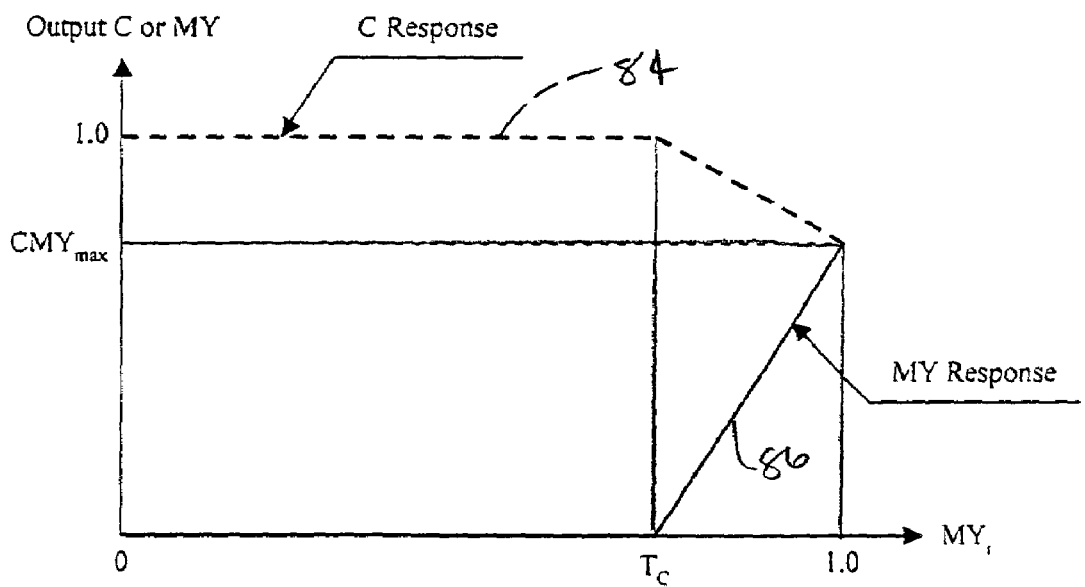
FIG. 6 is a graph of the response functions for the output CMY versus the input of equal M and Y on the cyan to black boundary.
Figure 7:
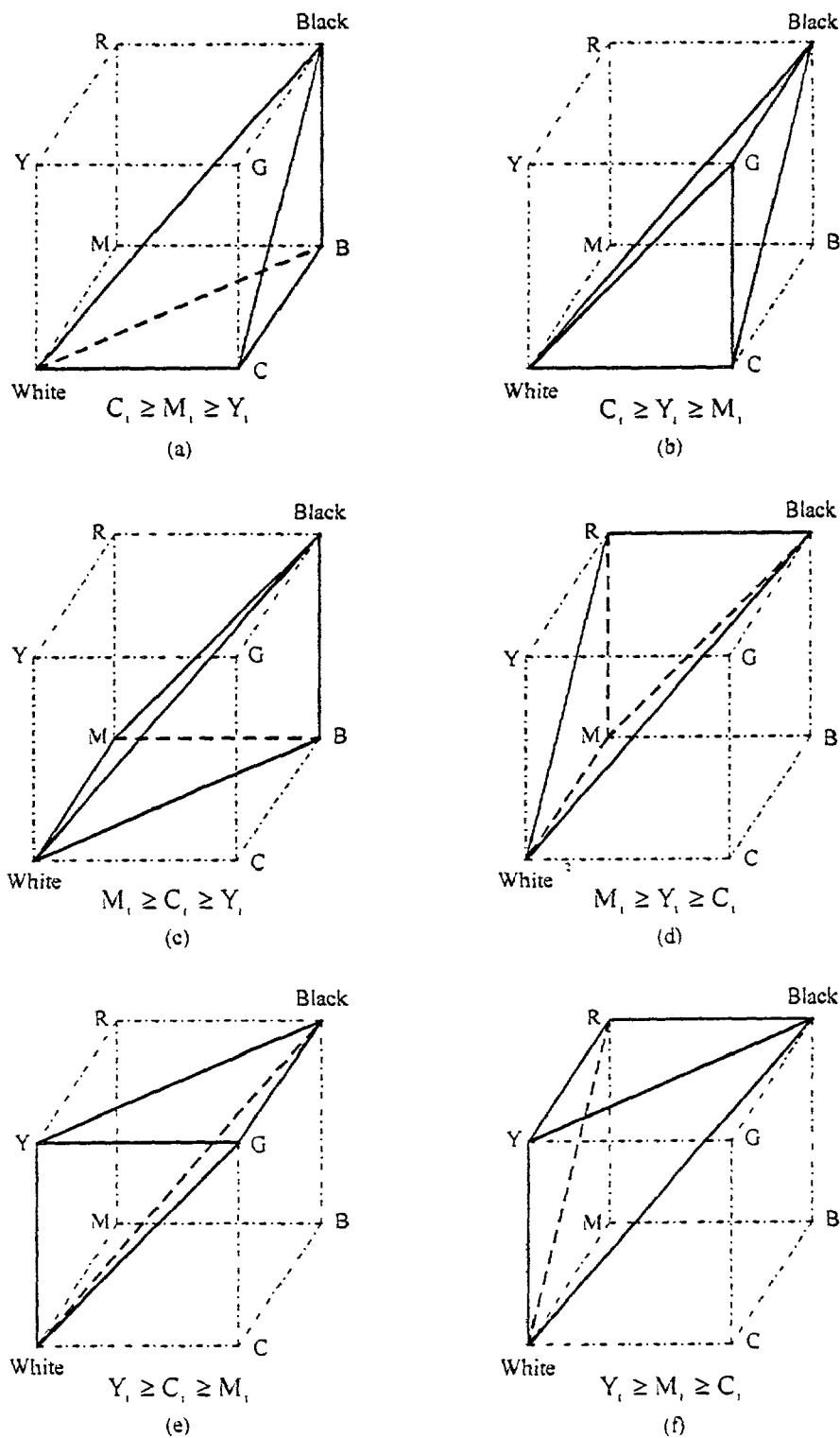
FIG. 7a–f depict the tetrahedra which define regions for color gamut interpolation.

These output responses are also shown in FIG. 6, where dotted line 84 is the C response and solid line 86 is the M and Y response. For simplicity, piece-wise linear functions are used here. Other functions that will gradually bring the output CMY amount from 1.0 for C and 0.0 for M and Y to $CMY_{max}$ may also be used instead of these piece-wise linear functions. The threshold may be experimentally determined and will only affect the colors close to the dark point, which is also called the "shadow area." In this area of the input color space, output colors will have a large amount of K and changing the output CMY amount will not have a significant affect on the output color gamut.

Referring again to FIG. 4, an arbitrary point P on triangular plane 52, is projected along the cyan axis to center diagonal 54 and boundary line 56. The projected points on lines 54 and 56 are E and F, respectively. The output CMYK values on points E and F are obtained by the procedure described above. Linear interpolation is then used to obtain the output CMYK on P based on the CMYK values on E and F. In addition to putting a boundary black generation LUT at line 56, additional boundary black generation LUTs may be put at other boundary lines connecting "Black" to a point on a circumference 58, connected by "C", "G", "Y", "R", "M", "B", and then back to "C", shown as a double line. An example is shown where a boundary black generation LUT is put at line 60, connecting "Black" and point D between "C" and "G." With this additional black generation LUT, output CMYYK values on triangular plane 62, bounded by "White", "Black", and D, may be obtained using the interpolation procedure described for plane 52. Points between planes 52 and 62 may be projected onto planes 52 and 62, then interpolated to obtain the output CMYK values for the desired input point based on the CMYK values on the projections.

In the preferred embodiment of the invention, six boundary black generation LUTs are used on the boundary lines connecting "Black" to the six vertices on circumference 58. "C", "G", "Y", "R", "M", and "B." As shown in FIGS. 7a–f, the triangular planes bounded by "Black", "White", and one of these vertices naturally divide the input CMY cube into six different tetrahedra. The black generation LUTs on the six boundary lines are denoted as $BG_C$, $BG_M$, $BG_Y$, $BG_R$, $BG_G$ and $BG_B$, respectively, according to the names of vertices on circumference 58. Thresholds $T_C$, $T_M$, $T_Y$, $T_R$, $T_G$ and $T_B$, respectively, are also assigned to the six boundary lines to control the smooth transition of the output CMY values to "Black" on these boundary lines. For an arbitrary input point, P, the tetrahedron that encloses the point may be obtained from the ordering information obtained by sorting the input CMY vector. Once the tetrahedron is determined, interpolation based on the center diagonal black generation LUT, $BG_0$, and two of the boundary LUTs on the tetrahedron may be used to obtain the output CMYK values for the input point. In the case that the input point is on one of the six triangular planes that divide the input CMY cube into six tetrahedra, then either tetrahedron that shares this plane may be used and the output CMYK values will be the same no matter which one is used.

Figure 8:
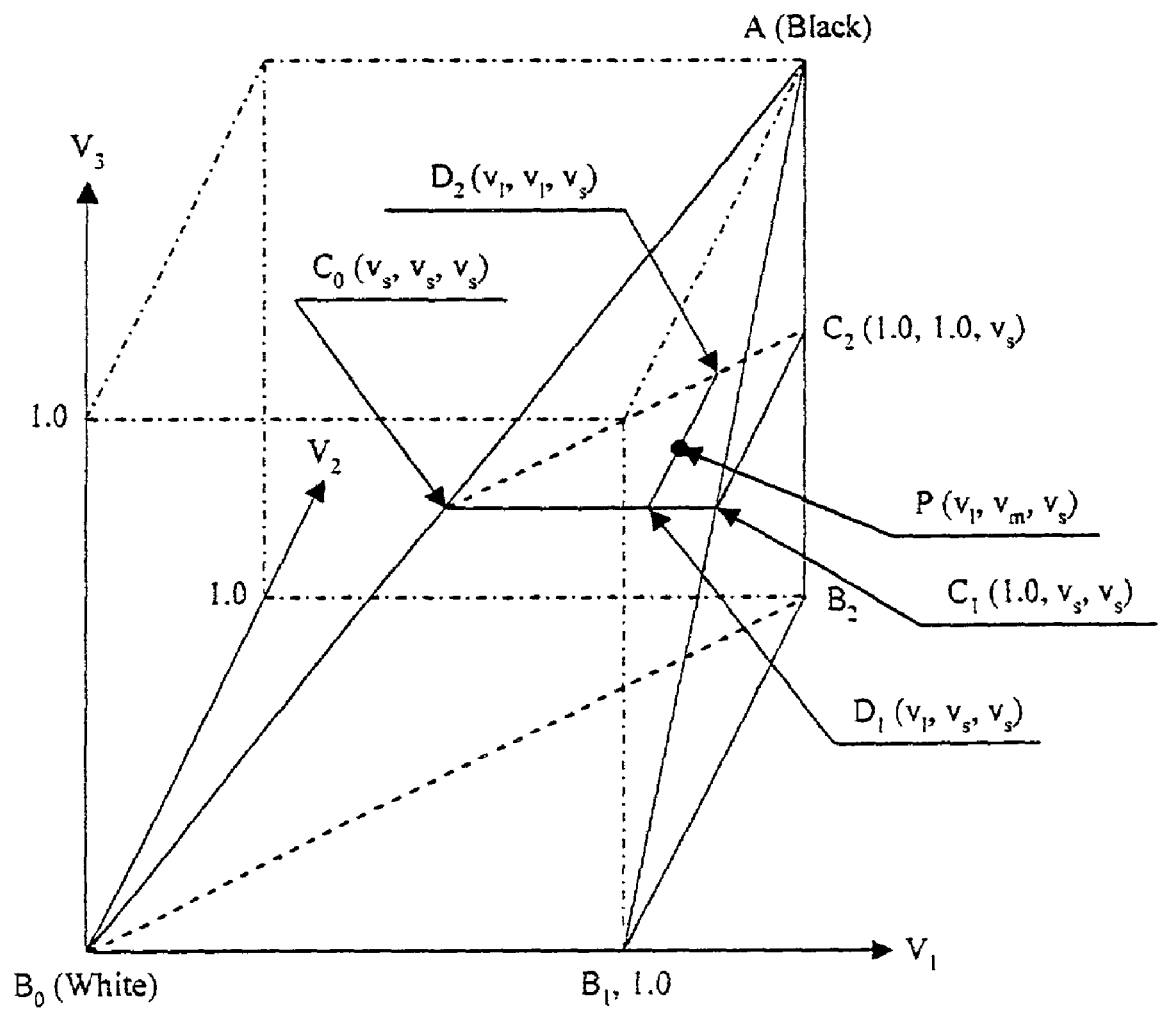
FIG. 8 depicts a tetrahedron in the re-ordered coordinate system.

FIG. 8 depicts the tetrahedron in the re-ordered coordinate system, where the input CMY vector is sorted into descending order $(v_l, v_m, v_s)$, $v_l \geq v_m \geq v_s$. In this coordinate system, axis $V_1$ is the axis for the largest component, axis $V_2$ is for the middle component, and axis $V_3$ is for the smallest component. The smallest component, $v_s$, is used to index into the black generation LUT, $BG_0$, at the center diagonal, and boundary black generation LUTs, $BG_1$ and $BG_2$ at boundary lines $B_1A$ and $B_2A$, respectively. The output of these black generation LUTs will be the output K values at points $C_0$, $C_1$, and $C_2$, respectively:

$$k^{(C0)} = BG_0(v_s), k^{(C1)} = BG_1(v_s), \text{ and } k^{(C2)} = BG_2(v_s). \quad (9)$$

The thresholds on lines $B_1A$ and $B_2A$ for the smooth transition of the output CMY values to the "Black" point are denoted as $T_1$ and $T_2$, respectively. The re-ordered output CMY values on $C_0$ may be obtained with Eq. 5:

$$(v_1^{(C0)}, v_2^{(C0)}, v_3^{(C0)}) = (v_s, v_s, v_s) * CMY_{max}. \quad (10)$$

The re-ordered output CMY values at $C_1$ may be obtained by Eqs. 7 and 8 by recognizing that the C, M, and Y components in those equations should be replaced by the largest, middle, and smallest components, respectively:

$$v_1^{(C1)} = \frac{CMY_{max} - 1.0}{1.0 - T_1}(v_s - T_1) + 1.0 \text{ if } v_s \geq T_1, \text{ otherwise} \quad (11)$$
$$v_1^{(C1)} = 1.0,$$
and
$$v_2^{(C1)} = v_3^{(C1)} = \frac{CMY_{max}}{1.0 - T_1}(v_s - T_1) \text{ if } v_s \geq T_1, \text{ otherwise} \quad (12)$$
$$v_2^{(C1)} = v_3^{(C1)} = 0.0.$$

Because the re-ordered input CMY vector at vertex $B_2$ is (1.0, 1.0, 0.0), the re-ordered output CMY values on boundary line $B_2A$ should smoothly transition from (1.0, 1.0, 0.0) at $B_2$ to $(CMY_{max}, CMY_{max}, CMY_{max})$ at A, or "Black." Therefore, the reordered output CMY values at $C_2$ may be written as:

$$v_1^{(C2)} = v_2^{(C2)} = \frac{CMY_{max} - 1.0}{1.0 - T_2}(v_s - T_2) + 1.0 \text{ if } v_s \geq T_2, \text{ otherwise} \quad (13)$$
$$v_1^{(C2)} = v_2^{(C2)} = 1.0, \text{ and}$$

-continued $$v_3^{(C2)} = \frac{CMY_{max}}{1.0 - T_2}(v_s - T_2) \text{ if } v_s \geq T_2, \text{ otherwise} \quad (14)$$

$$v_3^{(C2)} = 0.0.$$

By projecting the input point P along axis $V_2$ on the plane perpendicular to axis $V_3$, intersections $D_1$ and $D_2$ are obtained on lines $C_0C_1$ and $C_0C_2$, respectively. Using linear interpolation, the re-ordered output CMYK values on the intersection points may be obtained by:

$$(v_1^{(D1)}, v_2^{(D1)}, v_3^{(D1)}, k^{(D1)}) = (1-w_1)*(v_1^{(C0)}, v_2^{(C0)}, v_3^{(C0)}, k^{(C0)}) + w_1*(v_1^{(C1)}, v_2^{(C1)}, v_3^{(C1)}, k^{(C1)}), \quad (15)$$

and $$(v_1^{(D2)}, v_2^{(D2)}, v_3^{(D2)}, k^{(D2)}) = (1-w_1)*(v_1^{(C0)}, v_2^{(C0)}, v_3^{(C0)}, k^{(C0)}) + w_1*(v_1^{(C2)}, v_2^{(C2)}, v_3^{(C2)}, k^{(C2)}), \quad (16)$$

where the weighting factor $w_1$ is given by:

$$w_1 = \frac{v_1 - v_s}{1.0 - v_s}. \quad (17)$$

The final re-ordered CMYK values at P are then interpolated from those on $D_1$ and $D_2$, $$(v_1, v_2, v_3, K) = (1-w_2)*(v_1^{(D1)}, v_2^{(D1)}, v_3^{(D1)}, k^{(D1)}) + w_2*(v_1^{(D2)}, v_2^{(D2)}, v_3^{(D2)}, k^{(D2)}), \quad (18)$$

where $(v_1, v_2, v_3)$ is the re-ordered output CMY vector and K is the output K value. The weighting factor $w_2$ is given by:

$$w_2 = \frac{v_m - v_s}{v_1 - v_s}. \quad (19)$$

Figure 9:
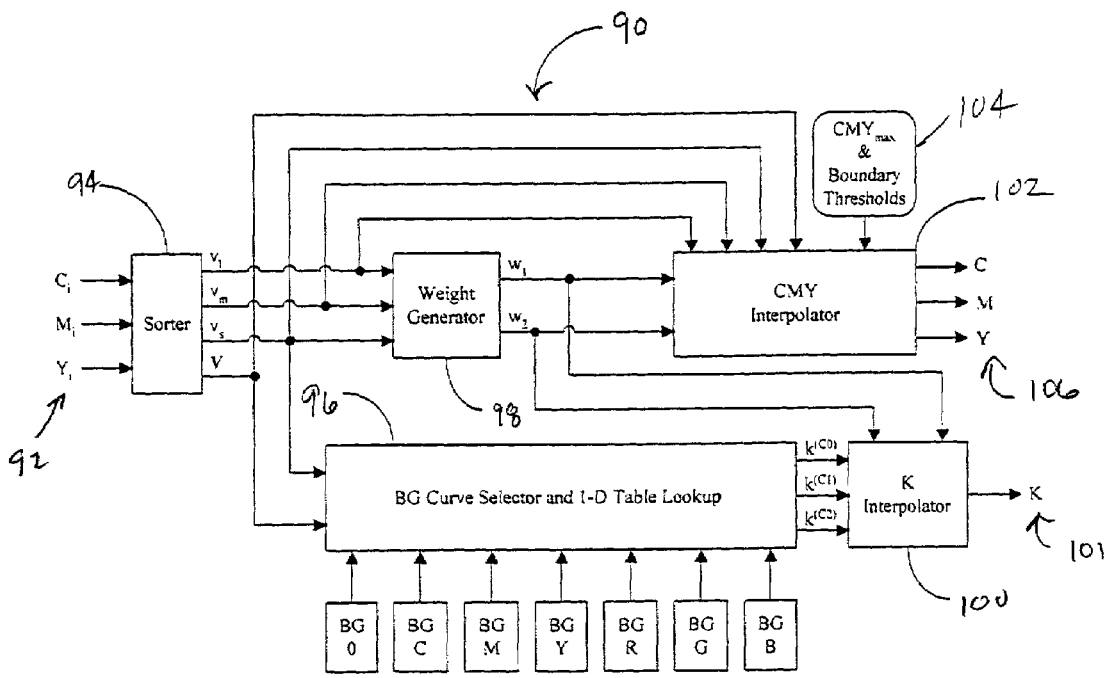
FIG. 9 is a block diagram of the invention.

A complete block diagram of the invention is shown in FIG. 9, generally at 90. The initial input CMY values 92 are first processed by a "Sorter" block 94 to obtain vectors in descending order, $(v_1, v_m, v_s)$, $v_1 \geq v_m \geq v_s$, and the ordering information V. The ordering information is then used as an input to the "BG Curve Selector and 1-D Table Lookup," block 96, to obtain the appropriate black generation LUTs. This process is equivalent to identifying the tetrahedron that encloses the input CMY vector. The black generation LUT at the center diagonal, $BG_0$, is always selected. Then two more black generation LUTs on the boundary lines, $BG_1$ and $BG_2$, are also selected. The selection process for boundary black generation LUTs is shown in Table 1.

TABLE 1

| Ordering Information | Boundary LUTs Selected |
| --- | --- |
| $C_i \geq M_i \geq Y_i$ | $BG_1 = BG_C$ and $BG_2 = BG_B$ |
| $C_i \geq Y_i \geq M_i$ | $BG_1 = BG_C$ and $BG_2 = BG_G$ |
| $M_i \geq C_i \geq Y_i$ | $BG_1 = BG_M$ and $BG_2 = BG_B$ |
| $M_i \geq Y_i \geq C_i$ | $BG_1 = BG_M$ and $BG_2 = BG_R$ |
| $Y_i \geq C_i \geq M_i$ | $BG_1 = BG_Y$ and $BG_2 = BG_G$ |
| $Y_i \geq M_i \geq C_i$ | $BG_1 = BG_Y$ and $BG_2 = BG_R$ |

The smallest of the input CMY values, $v_s$, is also an input to block 96. It is used to index the selected black generation curves to obtain output K values at points $C_0$, $C_1$, and $C_2$, as shown in Eq. 9. A "weight generator," block 98 generates weighting factors $w_1$ and $w_2$ based on Eqs. 17 and 19. These weights are used in the "K Interpolator," block 100 to obtain the final output K amount 101. The interpolation formulas are Eqs. 15, 16, and 18 for the K component. In the "CMY Interpolator," block 102, boundary thresholds $T_1$ and $T_2$ are selected from block 104, based on Table 2.

TABLE 2

| Ordering Information | Boundary Thresholds Selected |
| --- | --- |
| $C_i \geq M_i \geq Y_i$ | $T_1 = T_C$ and $T_2 = T_B$ |
| $C_i \geq Y_i \geq M_i$ | $T_1 = T_C$ and $T_2 = T_G$ |
| $M_i \geq C_i \geq Y_i$ | $T_1 = T_M$ and $T_2 = T_B$ |
| $M_i \geq Y_i \geq C_i$ | $T_1 = T_M$ and $T_2 = T_R$ |
| $Y_i \geq C_i \geq M_i$ | $T_1 = T_Y$ and $T_2 = T_G$ |
| $Y_i \geq M_i \geq C_i$ | $T_1 = T_Y$ and $T_2 = T_R$ |

The reordered CMY output values at points, $C_0$, $C_1$ and $C_2$ are obtained by Eqs. 10–14. With the weighting factors from weight generator 98, the re-ordered output CMY values are obtained by Eqs 15, 16, and 18. Finally, the ordering information, V, is used to convert the reordered output CMY values into the correct output CMY values 106.

Design Parameters

Figure 10:
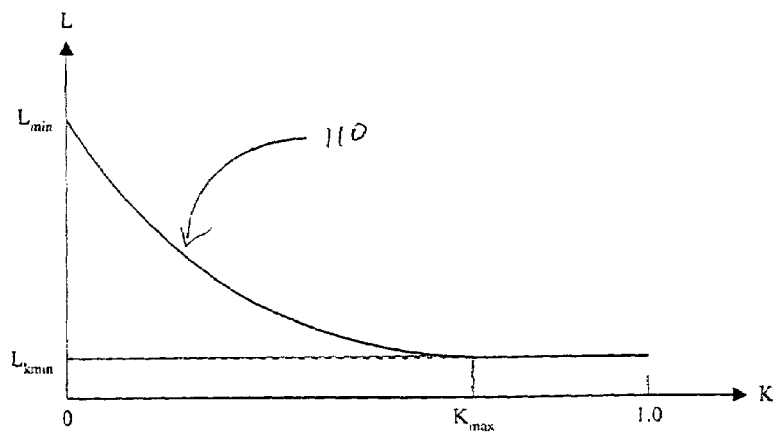
FIG. 10 depicts a L versus K curve.

The first design parameter to be determined is the maximum output K amount, $K_{max}$. Ideally, color patches having maximum CMY amount (C=M=Y=1.0) and K changes from 0.0 to 1.0, would be printed, however, this is not a viable solution for most technologies. Color patches having known CMY values may be printed to form a base line. The L response of these color patches is measured. A typical L versus K plot is shown in FIG. 10, generally at 110. From this plot, it may be seen that after a certain K threshold, increasing K will not make the image significantly darker. This threshold is defined as $K_{max}$.

Figure 11:
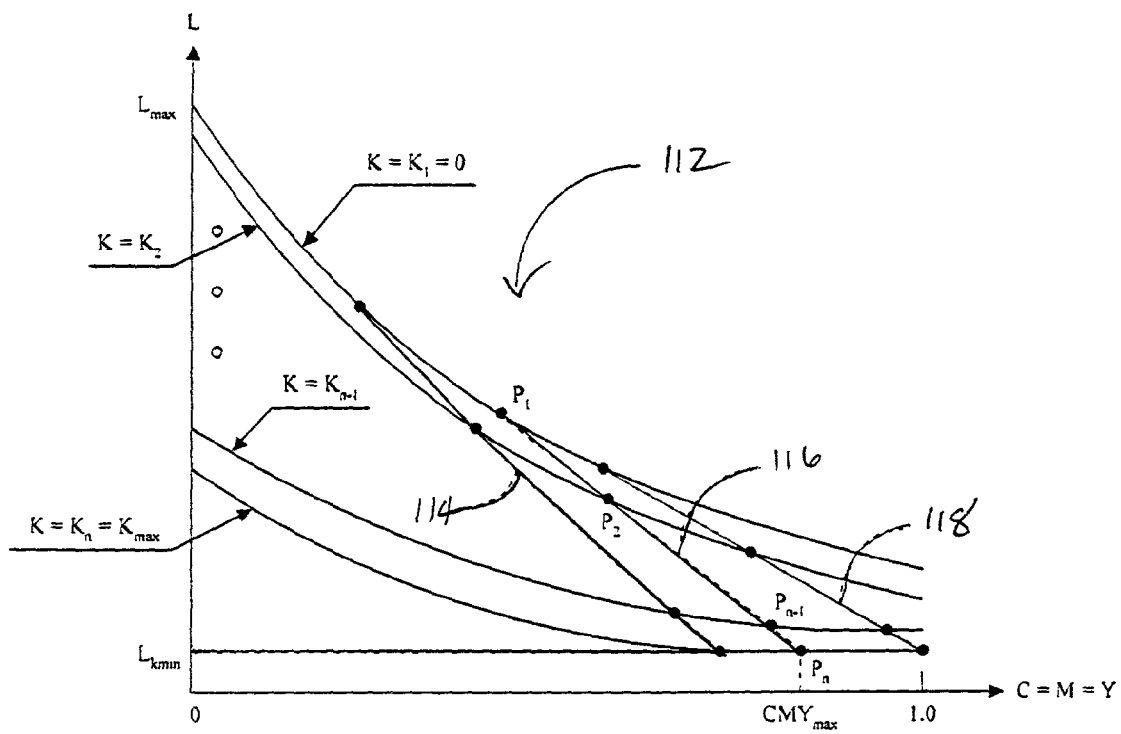
FIG. 11 depicts a family of L versus equal output CMY curves for determining the black generation LUT at the center diagonal.

Next, the center black generation LUT, $BG_0$, is designed. Referring now to FIG. 11, after obtaining the maximum K amount, a two dimensional array of color patches is printed, where the K value goes from $K_1$=0.0 to $K_n$=$K_{max}$, and equal CMY values range from 0.0 to 1.0. After measuring the L responses from the color patches, the data is plotted as a family of L versus CMY curves, shown generally at 112, indexed by K ranging from 0.0 to $K_{max}$. From this family of L versus CMY curves, a single L versus CMY curve with a variable amount of K may To be designed. The intersections of such a curve with the family of L versus CMY curves provide the K versus CMY curve. Three such curves presenting three different black generation strategies are shown by curves 114, 116 and 118. In curve 118, the maximum output CMY values reach 1.0, and the curve is flatter in the shadow area (small L value) compared to the other two curves. This is the case where the output CMY amount is not reduced even when K is used to provide better shadow details. As shown by curve 114, the maximum output CMY values only reach as far as the point where the minimum L values, $L_{kmin}$, are maintained. This is the case where the output CMY amount is reduced as much as possible when K is used. Because the slope in the shadow area is not as flat as that of curve 118, the shadow details in this case are not as good. However, because the output CMY amount is significantly reduced with the addition of K, this saves ink. A case between these two extremes is shown by curve 116, in the middle, where the maximum output CMY amount may be constrained by the total ink limitation. The total ink limitation, $M_{ink}$, is the total amount of CMYK ink allowed to be put on paper. This is usually less than 400% or 4.0 in the normalized notation. With $M_{ink}$ and $K_{max}$, the maximum output CMY amount is obtained by:

$$CMY_{max} = \min\left(1.0, \frac{M_{ink} - K_{max}}{3}\right). \quad (20)$$

Figure 12:
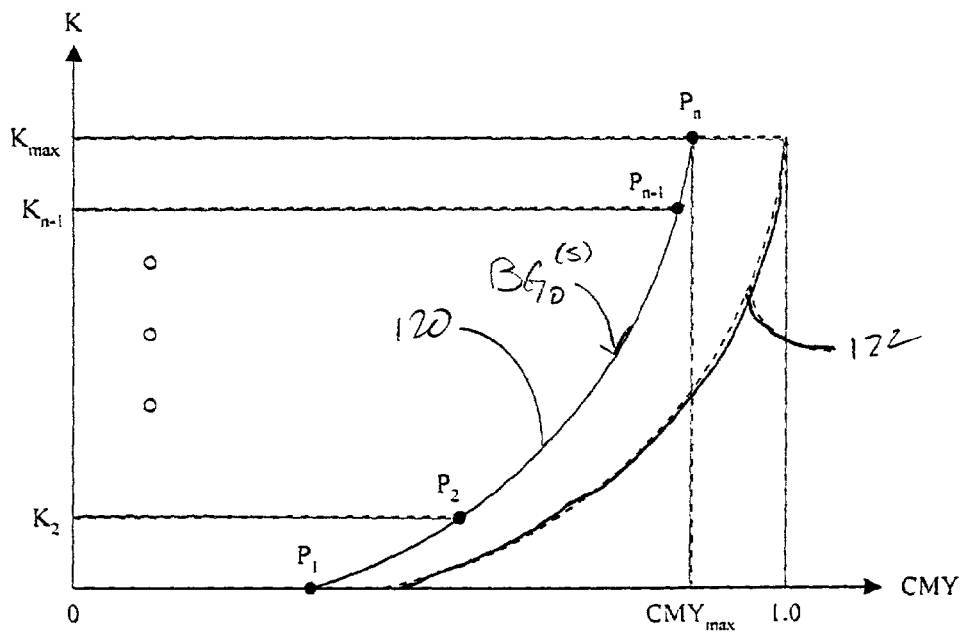
FIG. 12 depicts a modified black generation curve at the center diagonal where the input axis is the output CMY values.

The intersections of curve 116 with the family of L versus CMY curves are shown as $P_1, P_2, \ldots P_{n-1}, P_n$, in FIG. 11. These points may be plotted in a K versus CMY graph, as shown in FIG. 12, where the value for the vertical axis, L, is replaced by the index of the curves, K. The K versus CMY curves, 120 and 122, correspond to curves 116 and 118 in FIG. 11, respectively. The K versus CMY plot, labeled $BG^{0(s)}$ in FIG. 12, depicts the relationship between the output black values and the output CMY values. Using the relation between the output and input CMY values at the center diagonal, as shown in Eq. 5, the center black generation LUT may be obtained by:

$$BG_0(CMY_1) = BG_0^{(s)}(CMY_1 * CMY_{max}). \quad (21)$$

Figure 13:
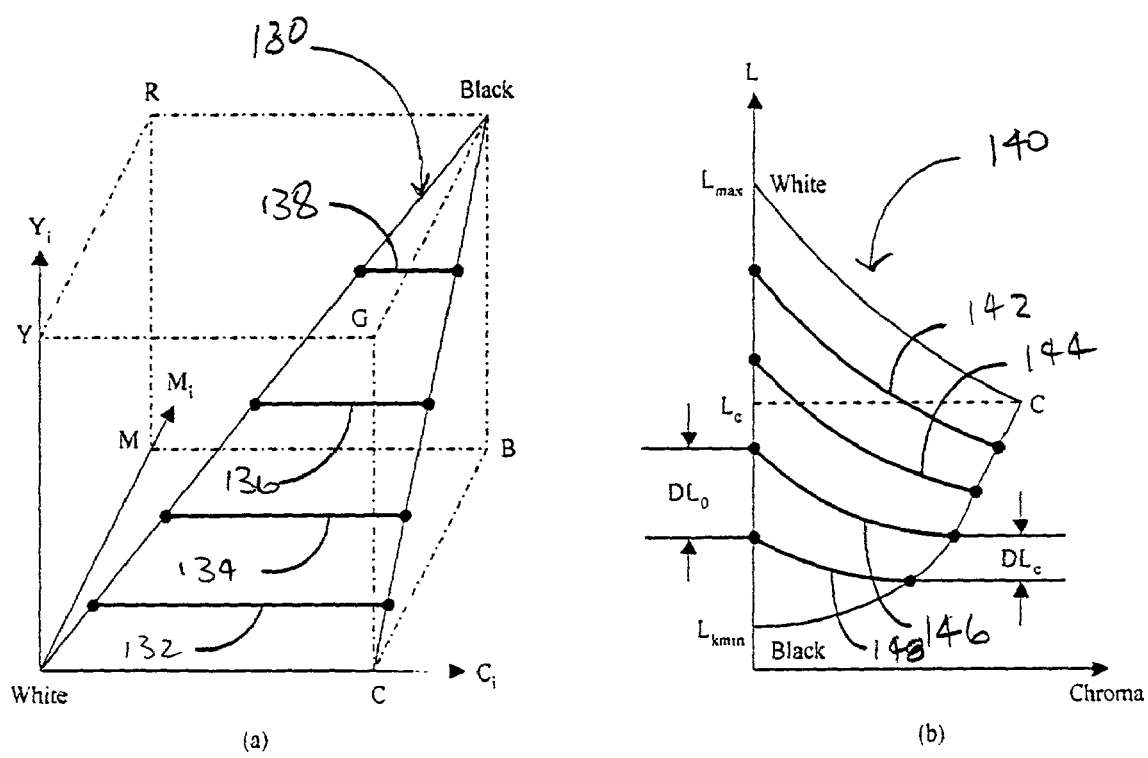
FIG. 13 depicts the criteria for design of a cyan boundary black generation curve.

The final step of the parameter design process of this invention is to design the boundary black generation LUTs and determine the boundary threshold values at the six boundary lines of the input CMY cube. The cyan-to-black boundary is used to illustrate how to design the LUT and determine the threshold. The same design procedure may be applied to other boundaries FIG. 13a depicts the input cyan triangular plane, generally at 130, and its output gamut in the CIELAB space, generally at 140 in FIG. 13b. In the cyan plane, line segments parallel to the $C_1$ axis, 132, 134, 136, and 138, are distributed along the $M_i = Y_i$ direction. The segments are distributed in such a way that intersection points of these line segments and the central diagonal line from "White" to "Black" are uniformly distributed on the L axis in the CIELAB space.

As shown in FIG. 13b, the four points on the L axis equally divide the line segment from $L_{kmin}$ to $L_{max}$ into five parts. The distance between each point pair is $DL_0$. Line segments 132, 134, 136, and 138 also translate into curves 142, 144, 146, and 148, respectively, in the CIELAB space. The black generation LUT on the cyan-to-black boundary, $BG_C$, determines the distribution of the intersection points of the curve segments and the boundary curve from "C" to "Black" in the CIELAB space. In the method of the invention, the design criterion for $BG_C$ is that the intersection points on the boundary are also uniformly distributed from "C" to "Black" in the CIELAB space. If the distance between a pair of points on the boundary in the CIELAB space is $DL_C$, then this criterion may be written as:

$$\frac{DL_0}{L_{max} - L_{kmin}} = \frac{DL_C}{L_C - L_{kmin}}, \quad (22)$$

where $L_C$ is the L value of the pure cyan colorant.

To design the boundary black generation LUTs, the L versus equal CMY input at the center diagonal needs to be determined. Because the black generation LUT at the center diagonal, $BG_0$, is already known, the output CMYK values on the center diagonal may be obtained by inputting equal CMY values to Eqs. 4 and 5. By printing out color patches with these output CMYK values and measuring their L values, the L versus CMY response may be obtained. This response is shown in Quadrant IV of FIG. 14, which is used to illustrate the method of obtaining the boundary black generation LUT on the cyan-to-black boundary, $BG_C$. This curve is called the tone reproduction curve (TRC) at the center diagonal, denoted as $TRC_0$. Another response required for obtaining $BG_C$ is the L versus K curve on the cyan-to-black boundary. To obtain this curve, color patches with the K amount going from 0.0 to $K_{max}$ and the corresponding CMY amount need to be printed and measured. On the cyan-to-black boundary, the CMY amount corresponding to the K amount is given by Eq. 23 and 24:

$$C = \frac{CMY_{max} - 1.0}{1.0 - K_C}(K - K_C) + 1.0 \text{ if } K \geq K_C, \text{ otherwise} \quad (23)$$

$$C = 1.0,$$

and $$M = Y = \frac{CMY_{max}}{1.0 - K_C}(K - K_C) \text{ if } K \geq K_C, \text{ otherwise} \quad (24)$$

$$M = Y = 0.0,$$

where $K_C$ is the threshold for the smooth transition of the output CMY values from C=1.0 and M=Y=0.0 on the cyan boundary to C=M=Y=$CMY_{max}$ at the black point. This threshold is usually set to something between 0.1 to 0.2, or 10% to 20%, and is later converted to the threshold for the input M and Y values on the cyan boundary, $T_C$. The L versus K response on the cyan boundary is the measured L values on these color patches plotted against the input K values as shown in Quadrant II of FIG. 14. This L versus K response curve is denoted as $LKR_C$.

Figure 14:
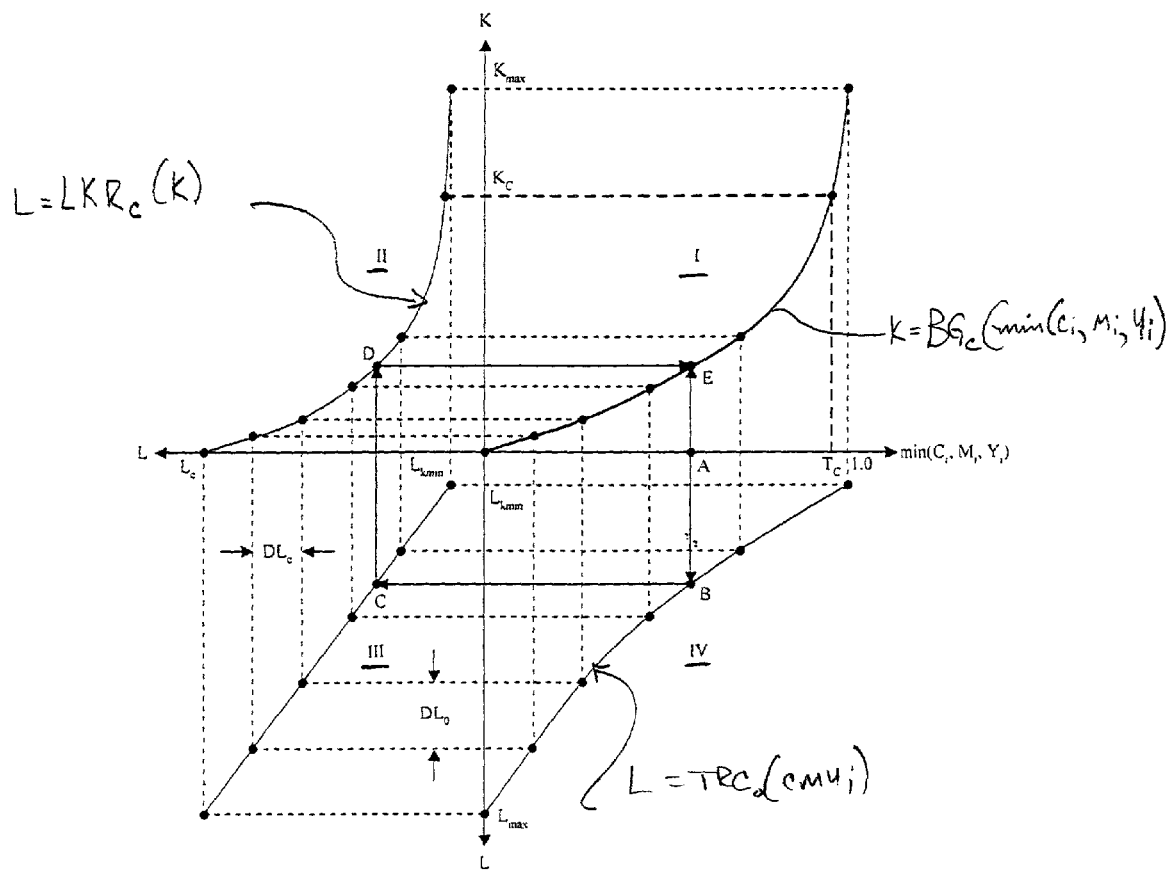
FIG. 14 depicts the construction of a cyan boundary black generation LUT from a tone reproduction curve (TRC).

FIG. 14 depicts a method of constructing the cyan boundary black generation LUT, $BG_C$, from the TRC on the center diagonal, $TRC_0$, and the L versus K response, $LKR_C$, at the cyan boundary. The cyan boundary black generation LUT, $BG_C$, and the TRC on the center diagonal, $TRC_0$, share the same input axis of M=Y, which is the same as the minimum of CMY on the cyan boundary. As shown in FIG. 14, $BG_C$ in Quadrant I, may be constructed by starting with an input value, at point A, on the min($C_i$, $M_i$, $Y_i$) axis. The output L value on the center diagonal for this input value, point B, is obtained by projecting it vertically downward to the $TRC_0$ curve in Quadrant IV. The output of the $TRC_0$ curve is then horizontally projected leftward to the linear scaling curve in Quadrant III. The linear scaling curve is used to scale the output range of $TRC_0$ into the output range of $LKR_C$. The output of the linear scaling, point C, is vertically projected upward to the output of $LKR_C$ in Quadrant II to obtain point D. The input K amount obtained from $LKR_C$ at point D will be the output K amount for $BG_C$. By projecting point D horizontally rightward and point A vertically upward, point E on $BG_C$ is obtained. The curve shown in Quadrant I is the constructed $BG_C$ curve. As shown in FIG. 14, the constraint in Eq. 22 is satisfied in this construction process.

After $BG_C$ is obtained, threshold $K_C$ is projected horizontally rightward to $BG_C$ and the corresponding value on the horizontal axis, $T_C$, will be the threshold on the cyan-to-black boundary. Some approximation is used here. Because black generation curve $BG_C$ is not a straight line between the input range from $T_C$ to 1.0, the linear relationship in Eqs. 23 and 24 in terms of K will not translate into linear relationship in terms of min($C_i$, $M_i$, $Y_i$), which means that the piece-wise linear functions in Eqs. 7 and 8, and in 11 and 12, are only approximations. Because the output CMYK colors in this area of the gamut are dominated by K, such approximations will only minimally affect the appearance of the final output color. The procedure for obtaining $BG_C$ and $T_C$ on the cyan-to-black boundary may be used to obtain the black generation LUTs and thresholds on other boundaries. This procedure may also be summarized by Eqs. 25 and 26:

$$BG_N(v_s) = LKR_N^{-1}\left(\frac{L_N - L_{k\min}}{L_{\max} - L_{k\min}}(TRC_0(v_s) - L_{k\min}) + L_{k\min}\right), \quad (25)$$

and $$T_N = BG_N^{-1}(K_N), \quad (26)$$

where N represents C, M, Y, R, G, or B and $v_s = \min(C_i, M_i, Y_i)$.

Thus, a method for CMYK color printer black generation using multiple lookup tables and interpolation has been disclosed. It will be appreciated that further variations and modifications thereof may be made within the scope of the invention as defined in the appended claims

We claim:

1. A method of determining colorant amounts to be laid down in a color printer comprising:
   inputting an initial set of cyan, magenta and yellow (CMY) input values;
   defining a gamut center black generation curve;
   defining a gamut boundary black generation curve;
   extending a surface between the gamut center black generation curve and the gamut boundary black generation curve;
   defining a second gamut boundary black generation curve and then extending a tetrahedron between the gamut center black generation curve and the two gamut boundary black generation curves, and interpolating a black colorant amount for the final set of CMY values in the tetrahedron;
   interpolating a black colorant amount for a final set of CMY values on the surface between two surfaces consisting of gamut center black generation curve and any gamut boundary black generation curve; and
   calculating the final set of CMY values.

2. The method of claim 1 which further includes defining an intermediate gamut black generation curve between the center black generation curve and the gamut boundary black generation curve, and interpolating a black colorant amount for the final set of CMY values between the center black generation curve and the intermediate black generation curve and between the intermediate black generation curve and the boundary black generation curve.

3. The method of claim 1 which further includes interpolating the final CMY colorant amounts from the initial CMY values, a maximum CMY ink limit constraint, and a set of boundary threshold values.

4. The method of claim 3 which further includes generating weighted values for said interpolation of CMY and black colorant amounts.

5. The method of claim 3 which further includes ordering the initial set of CMY values to determine largest, middle and smallest values of the three values; and indexing the black generation curves to determine the black values for each black generation curve as a function of the minimum of the CMY values, wherein said interpolating final output CMY colorant amounts is done as a function of the minimum of the CMY values.

6. The method of claim 1 which further includes selecting design parameters to determine black generation curves, including:
   determining a center black generation curve, including:
      defining a key threshold, $K_{max}$;
      defining a family of L v. CMY curves, including curves wherein
         a maximum output CMY value reaches 1.0;
         a maximum output CMY value reaches $L_{kmin}$, where $L_{kmin}$ is the minimum L value; and
         a maximum output CMY value reaches $M_{ink}$, where $M_{ink}$ is the total ink limitation;
   determining color boundary black generations curves to determine a color boundary threshold for boundary lines of the input color values, including:
      defining a tone reproduction curve at the center diagonal of the color gamut;
      measuring a L v. K response on a color boundary; and
      defining the color boundary black generation curve as a function of the tone reproduction curve and the L v. K response at the color boundary.

7. A method of determining colorant amounts to be laid down in a color printer comprising:
   determining an initial set of cyan, magenta and yellow (CMY) values;
   selecting a gamut center black generation LUT and a gamut boundary black generations LUT from a set of black generation LUTs from a selection table;
   indexing the selected black generation LUTs to determine black values for each black generation LUT;
   interpolating a final black colorant amount from the black values; and
   interpolating final CMY colorant amounts from the initial CMY values, a maximum CMY ink limit constraint, and a set of boundary threshold values.

8. The method of claim 7 which further includes ordering the initial set of CMY values to determine largest, middle and smallest values of the three values and generating an ordering vector; and indexing the selected black generation LUTs to determine the black values for each black generation LUT as a function of the minimum of the CMY values.

9. The method of claim 8 which further includes generating weighted values for said CMY and said black interpolation.

10. The method of claim 8 wherein said interpolating final output CMY colorant amounts is done as a function of the minimum of the CMY values.

11. The method of claim 7 which includes generating a 3-D color LUT.

12. The method of claim 11 which includes generating a combined color LUT from a 3-D color LUT and the black generation LUT.

13. The method of claim 7 which further includes selecting design parameters to determine black generation curves, including:
   determining a center black generation curve, including:
      defining a key threshold, $K_{max}$;
      defining a family of L v. CMY curves, including curves wherein
         a maximum output CMY value reaches 1.0;
         a maximum output CMY value reaches $L_{kmin}$, where $L_{kmin}$ is the minimum L value; and
         a maximum output CMY value reaches $M_{ink}$, where $M_{ink}$ is the total ink limitation;
   determining color boundary black generations curves to determine a color boundary threshold for boundary lines of the input color values, including:

defining a tone reproduction curve at the center diagonal of the color gamut;
measuring a L v. K response on a color boundary; and
defining the color boundary black generation curve as a function of the tone reproduction curve and the L v. K response at the color boundary.

14. A method of determining colorant amounts to be laid down in a color printer comprising:
determining an initial set of cyan, magenta and yellow (CMY) values;
determining a minimum CMY colorant amount;
placing a black generation LUT set in a selection table;
selecting, from the selection table, a center gamut black generation LUT and two boundary black generation LUTs, including sorting the initial set of CMY values to determine the largest, middle and smallest values of the three values and generating an ordering vector, and indexing the selected black generation LUTs to determine black values for each black generation LUT as a function of the minimum of the CMY values; interpolating a final output black colorant amount from the black values; and interpolating final output CMY colorant amounts from the initial set of CMY values; and
interpolating the black generation LUT set to maximize the printing gamut.

15. The method of claim 14 which includes generating a 3-D color LUT.

16. The method of claim 15 which includes generating a combined color LUT from the 3-D color LUT and the black generation LUT.

17. The method of claim 14 which further includes selecting design parameters to determine black generation curves, including:
determining a center black generation curve, including:
defining a key threshold, $K_{max}$;
defining a family of L v. CMY curves, including curves wherein
a maximum output CMY value reaches 1.0;
a maximum output CMY value reaches $L_{kmin}$, where $L_{kmin}$ is the minimum L value; and
a maximum output CMY value reaches $M_{ink}$, where $M_{ink}$ is the total ink limitation;
determining color boundary black generations curves to determine a color boundary threshold for boundary lines of the input color values, including:
defining a tone reproduction curve at the center diagonal of the color gamut;
measuring a L v. K response on a color boundary; and
defining the color boundary black generation curve as a function of the tone reproduction curve and the L v. K response at the color boundary.

18. A method of determining colorant amounts to be laid down in a color printer comprising:
inputting initial CMY values;
generating vectors in descending order, $(v_l, v_m, v_s)$, $v_l \geq v_m \geq v_s$, and determining ordering information V;
selecting design parameters to determine black generation curves, including:
determining a center black generation curve, including:
defining a key threshold, $K_{max}$;
defining a family of L v. CMY curves, including curves wherein
a maximum output CMY value reaches 1.0;
a maximum output CMY value reaches $L_{kmin}$, where $L_{kmin}$ is the minimum L value; and
maximum output CMY value reaches $M_{ink}$, where $M_{ink}$ is the total ink limitation;
determining color boundary black generations curves to determine a color boundary threshold for boundary lines of the input color values, including:
defining a tone reproduction curve at the center diagonal of the color gamut;
measuring a L v. K response on a color boundary; and
defining the color boundary black generation curve as a function of the tone reproduction curve and the L v. K response at the color boundary;
inputting ordering information into a black generation curve selector and 1-D LUT to obtain black generation LUTs, including, selecting black generation curves including the a center diagonal curve, $BG_0$, and at least two black generation LUTs on boundary lines, $BG_1$ and $BG_2$, according to a boundary black generation LUT;
determining the smallest of the input CMY values, $v_s$, and inputting $v_s$ into the black generation curve selector to index the selected black generation curves to obtain output K values at points $C_0$, $C_1$, and $C_2$;
generating weighting factors $w_1$ and $w_2$;
inputting the weighting factors into a K Interpolator to determine the final output K amount;
selecting boundary thresholds $T_1$ and $T_2$ in a CMY Interpolator based on a boundary threshold table;
obtaining reordered CMY output values at points, $C_0$, $C_1$ and $C_2$;
inputting the weighting factors into a CMY Interpolator to determine the final reordered CMY amount; and
converting the reordered output CMY values with ordering information V to determine output CMY values.

* * * * *